United States Patent
Stevens

(10) Patent No.: US 7,086,064 B1
(45) Date of Patent: Aug. 1, 2006

(54) PERFORMANCE PROFILING TOOL

(75) Inventor: Alan P Stevens, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 902 days.

(21) Appl. No.: 09/631,224

(22) Filed: Aug. 2, 2000

(30) Foreign Application Priority Data

May 27, 2000 (GB) .................. 0012914.8

(51) Int. Cl.
*G06F 15/163* (2006.01)
(52) U.S. Cl. .............. 719/310; 719/317; 709/201; 709/202
(58) Field of Classification Search ........... 709/318, 709/317, 201, 202, 1; 719/310, 317
See application file for complete search history.

(56) References Cited

U.S. PATENT DOCUMENTS

| | | | |
|---|---|---|---|
| 5,918,004 A * | 6/1999 | Anderson et al. ........... 714/38 |
| 6,202,085 B1 * | 3/2001 | Benson et al. ............ 709/205 |
| 6,356,559 B1 * | 3/2002 | Doucette et al. .......... 370/450 |
| 6,385,661 B1 * | 5/2002 | Guthrie et al. ............ 719/316 |
| 6,457,142 B1 * | 9/2002 | Klemm et al. ............. 714/38 |
| 6,574,675 B1 * | 6/2003 | Swenson .................. 709/316 |

FOREIGN PATENT DOCUMENTS

| | | |
|---|---|---|
| EP | 1004964 | 5/2000 |
| WO | 9638733 | 12/1996 |

* cited by examiner

*Primary Examiner*—William Thomson
*Assistant Examiner*—Andy Ho
(74) *Attorney, Agent, or Firm*—Gerald R. Woods

(57) ABSTRACT

The invention relates to an apparatus for providing event data, generated by a JVM local to the apparatus, to a profiling agent on a remote system as requested by that agent. A request is received at the apparatus, via a network interface, from the profiling agent for certain event data. This request is forwarded via the JVMPI to the JVM and the requested data is transmitted to the apparatus, as and when generated by the JVM. (The event data is also transmitted via the JVMPI). The event data is then transmitted to the profiling agent via the network interface.

5 Claims, 10 Drawing Sheets

PERFORMANCE PROFILING TOOL

FIELD OF INVENTION

The present invention relates to performance profiling and more particularly to profiling an application running on a target computer remotely.

BACKGROUND OF THE INVENTION

Computers have proliferated into all aspects of society and increasingly form the backbone of large organisations. When a computer system fails to respond as intended, businesses are invariably unable to provide even the most basic of services. Money, reputation or even lives may be lost, dependant upon the criticality of the service, the outage time etc.

In today's increasingly competitive market-place, quality is of the utmost concern. Users' expectations are high and thus the reliability of hardware/software is especially important. Customers do not tolerate mistakes and the later a defect is discovered, the more costly it can prove to the manufacturer.

Typically software developers implement a rigorous testing regime in order to ensure that a product or system is fully operational and consistently performs according to its functional specification, before it is made available to the public. Providing efficient code is an important aspect of the testing lifecycle. Just as frustrating as software that doesn't execute as expected, is software with an unacceptably poor response time.

Performance profiling tools permit developers to measure and display program performance. Profiling in the broadest sense means the ability to monitor and trace events that occur at run-time; to calculate the cost of these events; and to apportion this cost to specific program modules. Memory leakages, performance bottlenecks etc are common problems which have to be addressed. Discovering where a piece of software spends the majority of its processing time and how effectively it uses system resources, is vital for performance fine tuning.

Recently, the Java programming language (Java is a trademark of Sun Microsystems Inc.) has risen to prominence. Java offers numerous advantages to developers. It is a platform-independent, object-orientated language, with client/server functionality. It is also a lightweight, dynamic language designed with security in mind. For all these reasons, an ever-increasing amount software is being written in Java.

A Java program executes using a Java Virtual Machine (JVM). This is central to many of the language's advantageous features, including its portability, efficiency and security. The JVM emulates a system's hardware, by stepping through a program and carrying out each instruction contained therein. Thus, the JVM need only be ported once for each operating environment and then all applications running on top of the virtual machine may execute unchanged. Furthermore, the JVM creates a layer of abstraction between a computer and the software being run on it, hence providing greater protection against malicious viruses etc.

With Java's growing popularity, performance profiling tools, which in particular monitor the performance of the JVM and applications running on top of it, have become an important issue. Sun Microsystems Java 2 software development kits (SDKs) support a performance profiling interface known as the Java Virtual Machine Profiling Interface (JVMPI). This is an interface provided to external agents written in the 'C' programming language which allows the agents to register with the JVM and receive notifications of events of interest to performance tools via this interface.

The JVMPI represents a considerable advance over previous Java profiling solutions as it offers a standard, extendible interface, agreed through consultation with Java tools vendors and other companies such as IBM. It defines a tool for acquiring comprehensive profiling data. Typically, the different profiling tools will have varying aims and require different information. For example, one may merely dump profile data to a trace file, while another tool may process the data selectively and interactively, and present a more sophisticated view via a graphical user interface. Tool vendors may write to the JVMPI, rather than having to code custom-built hooks directly into the JVM itself. It allows them to access consistent interfaces and events on JVM implemtnations which have a JVMPI consistent with Sun's definition. Commercially available profiling tools include Jprobe from KL Group Inc., Canada and True Coverage from Compuware NuMega, America.

FIG. 1a is a high-level schematic diagram of the operation of a performance tool profiling the JVM using the JVMPI according to the prior art. A computer 10 runs a JVM 20. A second computer 30 runs a performance tool 40 for profiling the JVM 20. It will, however, be appreciated that the performance tool 40 and the profiler agent 50 may run on the same computer (ie computer 10 or computer 30). The performance tool communicates over a tool-specific wire protocol via arrow 1 with a profiler agent 50. The agent implements all the JVMPI interface functions it requires and has to deal with the event data it receives, passing information back to performance tool 40 as required. The JVM calls this in order to enable the agent to receive events (via arrow 2) from the JVM via the JVMPI 60 at run-time. Events can include heap allocation, thread start etc., and the agent then communicates such information to the performance tool (arrow 1). On the basis of this, the tool can determine, for example, heavy memory allocation sites, unnecessary object retention, monitor contention etc. The agent sends controls and requests for more information to the JVM (arrow 3) also via the JVMPI. In order to enable this, the JVM implements a number of call-back functions. The agent may, for example, switch on or off notification of a specific event (via the EnableEvent and DisableEvent functions) in accordance with the requirements of the remote tool 40. The agent may also request notification of certain types of event such as HEAP_DUMP and MONITOR DUMP, via the RequestEvent function.

FIG. 1b shows in more detail the operation a performance tool profiling the JVM according to the prior art. It should be read in conjunction with FIG. 1a. Appendix A shows the source code for a simple profiler agent provided by Sun Microsystems. The text may be cross-referenced with the code in order to aid comprehension.

The JVM 20 is launched with the command "-Xrun-MyProfiler", where "MyProfiler" is the profiler agent 50 (step 60). The agent has an entry point (method) JVM_Onload. By default the -Xrun command registers the JVM through this method in the agent 50.

Before the agent can register to receive a particular event (via arrow 2) however, a function call interface must be obtained by issuing a GetEnv call on a JavaVM pointer (step 65). This pointer forms part of the JVM environment and is responsible for retrieving a further pointer (jvmpi_interface) to the JVMPI 60. The JVMPI facilitates the enablement, requesting and general processing of events using the Notifyevent( ) and other known functions (eg EnableEvent, DisableEvent etc). Additionally the GetEnv function verifies that the current version of the JVM is supported by the JVMPI. Only versions 1.2 and later of the Java Development Kit (JDK) are compatible.

Once the jvmpi_interface pointer has been returned, the JVMPI is then initialized (step 70). The JVMPI includes the NotifyEvent( ) function which the JVM would normally invoke with each new event. However, in order for the profiler agent to receive the events rather than the profiler interface, it is necessary to redirect the pointer, and this is acheived via "jvmpi_interface->NofifyEvent=notifyEvent". The agent code includes the notifyEvent function and this is now pointed to.

The profiler agent invokes an EnableEvent( ) function via "JVMPI_Interface->EnableEvent( )" in order to instruct the JVM to communicate a given event to the notify Event function upon occurrence of that even (step 75). Such events are then received by the profiler agent from the JVMPI (step 80).

One example of a basic, JVMPI compatible, profiling agent, is HPROF which is shipped with Java 2 SDK, Standard Edition, version 1.2 and later. It interacts with the JVMPI in order to provide the user with data either directly or through a profiling front-end (ie performance tool). Note, the front-end may either be local to the JVM or on a remote machine. HPROF simply dumps data to a report file, permitting very little control of that data. This file can however be further processed by the performance tool. The file may again be local to the JVM or on a remote machine (typically, the machine upon which the performance tool is executing).

The implementation described above has a number of drawbacks. The presence of the JVMPI in a JVM on a computer requires the JVMPI profiling agent to reside on that computer in order to register and receive events for subsequent processing. This means that for each and every tool, the JVMPI agent 'C' code must be ported to the target computer, compiled, debugged and shipped by the tool writer. In practice, this has meant that Java 2 performance tools have not supported all the computer platforms which have JVMPI implementations—in just over a year after Java 2 launched in December 1998, only Windows NT and Solaris platforms have third party tools working with the Sun JVM. Support is not, for example, provided for many platforms such as OS/390 from IBM and it may be difficult to find the skills and machines to allow the tools vendors to implement their tools on all platforms. As Java becomes established as a major programming language, the availability of performance tools on both development and deployment computers becomes a prerequisite for business-critical applications.

Furthermore, all performance tools perturb the performance characteristics of the system they are measuring, unless they are built in and cannot be disabled. The events which the JVMPI is capable of generating that are of interest to performance tools, such as method entry and exit, occur very frequently and can accumulate high data volumes. Additionally, many 3rd party tools offer 'real time' visualization of Java performance data as it is being generated. If the computer being measured is the same one as is being used to display the data, the perturbation of the data can, once again, be considerable.

The IBM Corporation recently announced the release of VisualAge Micro Edition. This provides an integrated development environment for building end-to-end embedded systems. In other words, it enables the development of applications connecting small, resource constrained devices, such as personal digital assistants (PDAs) and cell phones, to enterprise back-end systems over the Internet.

VisualAge Micro Edition is shipped with a profiler for monitoring the performance of a JVM running within an embedded system, as well as applications executing on top of the virtual machine. This profiler can either sit directly on the embedded device or be run remotely from a development workstation. A remote setup has the advantage that the minimum of load is placed on the embedded device.

FIG. 2 is a schematic diagram of such a remote profiler configuration. An embedded device 100 runs a JVM 110. A computer 130 runs a profiler agent 140. The JVM receives control commands from the agent and in return the agent receives events from the JVM. The agent communicates the information received from the JVM to a performance tool 150.

While the profiler agent communicates remotely with the JVM 110, it does so via a direct entry-point. In other words, the JVM 110 itself has been specially modified to support the Profiler Agent 140. The JVMPI and all the advantages it provides have been dispensed with in this solution. Although the agent code does not have to be ported to the embedded device, it does have to be compiled and debugged by the tool writer in order to be compatible with the specific JVM implementation.

In my own work leading up to the invention described below. I considered providing remote access for profiling agents via the JVMPI to achieve greater portability. FIG. 3 shows the constituent parts of what I considered. A computer 207 runs a profiling agent 280 which profiles a JVM 200 running on a second computer 205. The JVM 200 sends events via a JVMPI 210 to a proxy 220. Proxy 220 is 'C' code and is responsible for receiving the profiling data generated by the JVM 200. In order to communicate this to computer 207 and ultimately the profiling agent 280, the event flow has to re-enter Java via a second JVM 230. It does this using the Java Native Interface (JNI) 225. This re-entry is so that existing java mechanisms can be used to transport the events to the profiling agent running on computer 207. Thus I believed transparency could be achieved, this being the primary aim. The intention is to have the profiling agent write to the JVMPI interface, whilst being completely unaware as to whether it is running locally or remotely.

In order to transmit events to the profiling agent there is a java proxy 235 running within JVM 230. This calls a remote method (java proxy) 265 running on computer 207 via a Remote Method Invocation (RMI) interface 255. Thus an existing protocol, Java Remote Method protocol (JRMP), is used to communicate with computer 207. Remote Method (Java Proxy) 265 runs within a third JVM 260 and receives the events. As disclosed, these are then communicated via the JNI 226 to the profiling agent 280. Intelligent caching of data is built-in, in order to minimise the network traffic.

After doing this work, I concluded this scenario would not achieve its primary aim of transparency. The profiling agent would realize that the events it receives from JVM 226 had indeed come from its local machine 207 rather than the true originator, JVM 200. This is because JNI interface 226 is presented to the profiling agent, rather than a JVMPI interface as should be the case. I stopped the described work without revealing it publicly and proceeded with completion of the invention described herein.

DISCLOSURE OF THE INVENTION

Accordingly, the invention provides an apparatus for providing application execution data to a profiling agent on a remote system as requested by said agent, wherein a first application local to said apparatus generates said application execution data, said apparatus comprising: means for receiving a request via a network interface from said profiling agent for said application execution data; means, responsive to said request, for requesting said application execution data from said first application via a local interface; means for receiving said application execution data from the first application via said local interface; and means, responsive to receipt of said application execution data, for transmitting said application execution data to the profiling agent via said network interface.

According to the preferred embodiment, the network interface exposes substantially all the functionality of the local interface to a profiling agent on a remote system. Thus the profiling agent does not have to be ported to the machine on which the first application is executing, nor does it have to be tailored accordingly. Rather it is the apparatus that is configured once for a particular platform to enable it to communicate with the local interface to receive the application execution data from the first application via that local interface. Remote profiling agents have to be modified once only to support the network interface which can be standard across all platforms. They are then able to communicate with the apparatus and receive the application execution data from the first application. The profiling agents themselves need operate only on a single platform, thereby greatly simplifying the development and maintenance tasks for the tool vendors. Furthermore, a single profiling agent may be operated to work with application execution data from multiple machines, thereby providing easy access to comparative machine performance analysis.

Preferably, the network interface further allows receipt of controls from the profiling agent and these are used to control the operation of the apparatus. Application execution data is received from the first application by the profiling agent either synchronously or asynchronously. At least one of the controls provides for selectively switching between these two modes. The synchronous mode can be used in problem determination since it is possible to track the flow of application execution data more easily, whilst the asynchronous mode is more efficient in terms of network resources.

Preferably, the controls are transmitted over a first connection, whilst the application execution data is transmitted over a second connection. Splitting the data flow in this way means that the transmittal of application execution data to the profiling agent does not interrupt the sending of controls and vice versa.

According to the preferred embodiment, there is a buffer for storing the application execution data prior to transmission to the profiling agent. This enables the data to be batched for transmission asynchronously. It will be appreciated that the first application may generate a large amount of data and by sending this data in batches the network is not flooded.

The application execution data generally includes events. Each buffered event is stored with a timestamp. This is used to ensure that the events are transmitted to the remote profiling agent in the order in which they were received from the first application.

According to the preferred embodiment, at least one of the events is specified as requiring synchronous transmission. Synchronous events for example are those to which the first application requires an immediate response from the profiling agent in order to prevent premature termination of that first application. Receipt of one of these events causes the buffer to be flushed and the apparatus to switch to synchronous mode.

Typically when in asynchronous mode, the contents of the buffer are transmitted to the profiling agent once the buffer has reached a pre-determined threshold, or alternatively the profiling agent may specifically request the contents of the buffer. Furthermore, when the first application terminates the contents of the buffer are also transmitted to the remote profiling agent. Note, the application execution data is preferably compressed prior to transmitting it to the profiling agent to reduce network bandwidth.

According to the preferred embodiment, the local interface is a java virtual machine profiling interface (JVMPI) and the first application is a java virtual machine (JVM). A second application executes on top of the JVM and causes it to generate the application execution data.

BRIEF DESCRIPTION OF THE DRAWINGS

A preferred embodiment of the present invention will now be described, by way of example only, and with reference to the following drawings.

Figure 1A:
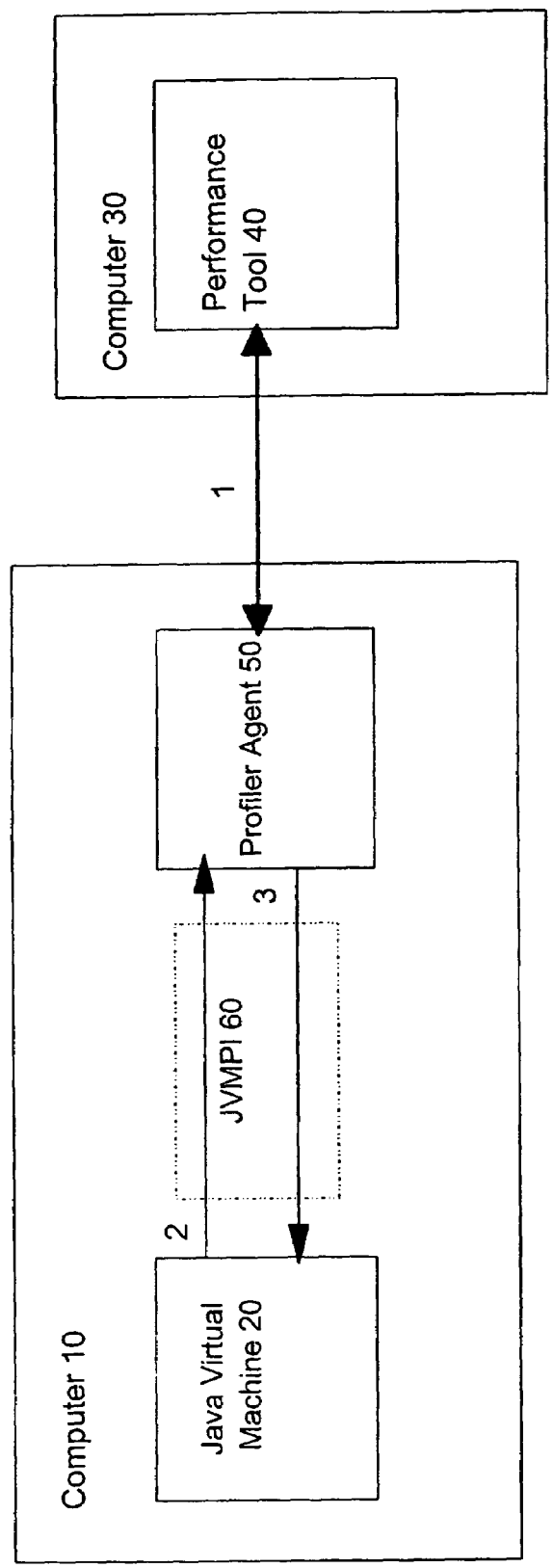
FIG. 1a is a schematic diagram of the operation of a performance tool profiling the JVM using the JVMPI according to the prior art.
Figure 1B:
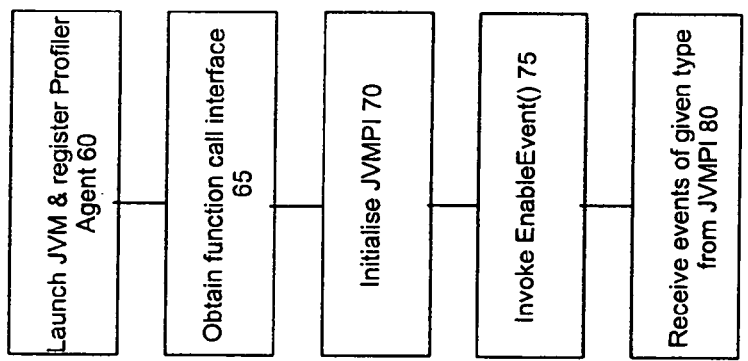
FIG. 1b shows in more detail the operation of a performance tool profiling the JVM according to the prior art.
Figure 2:
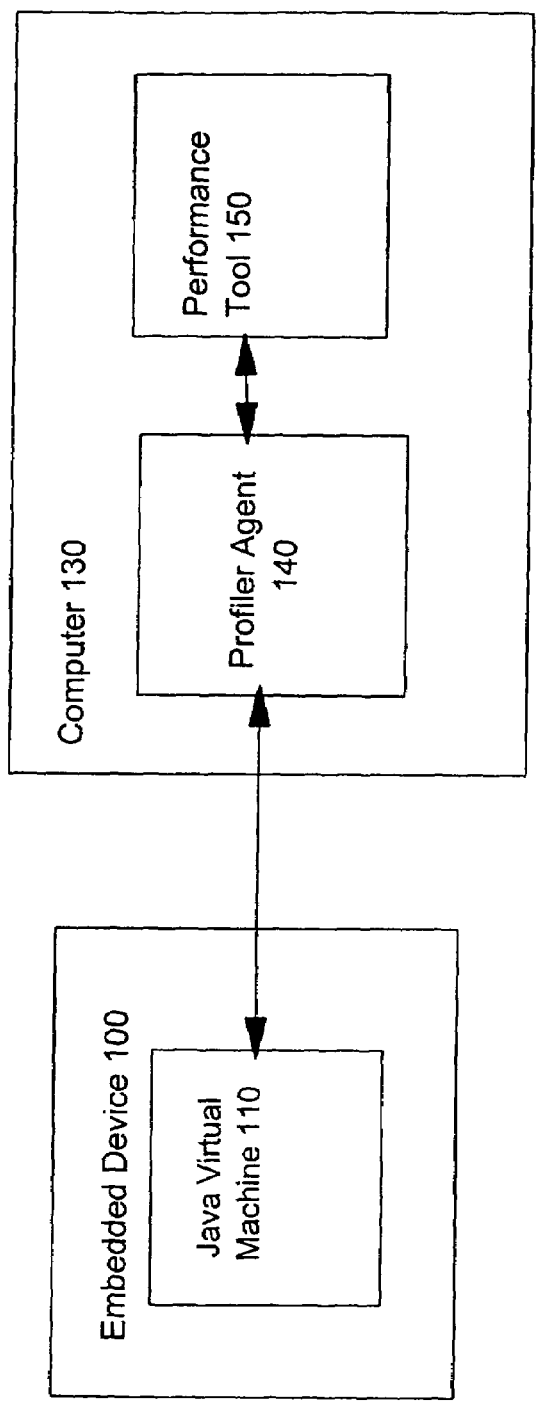
FIG. 2 illustrates a prior art remote profiler configuration.
Figure 3:
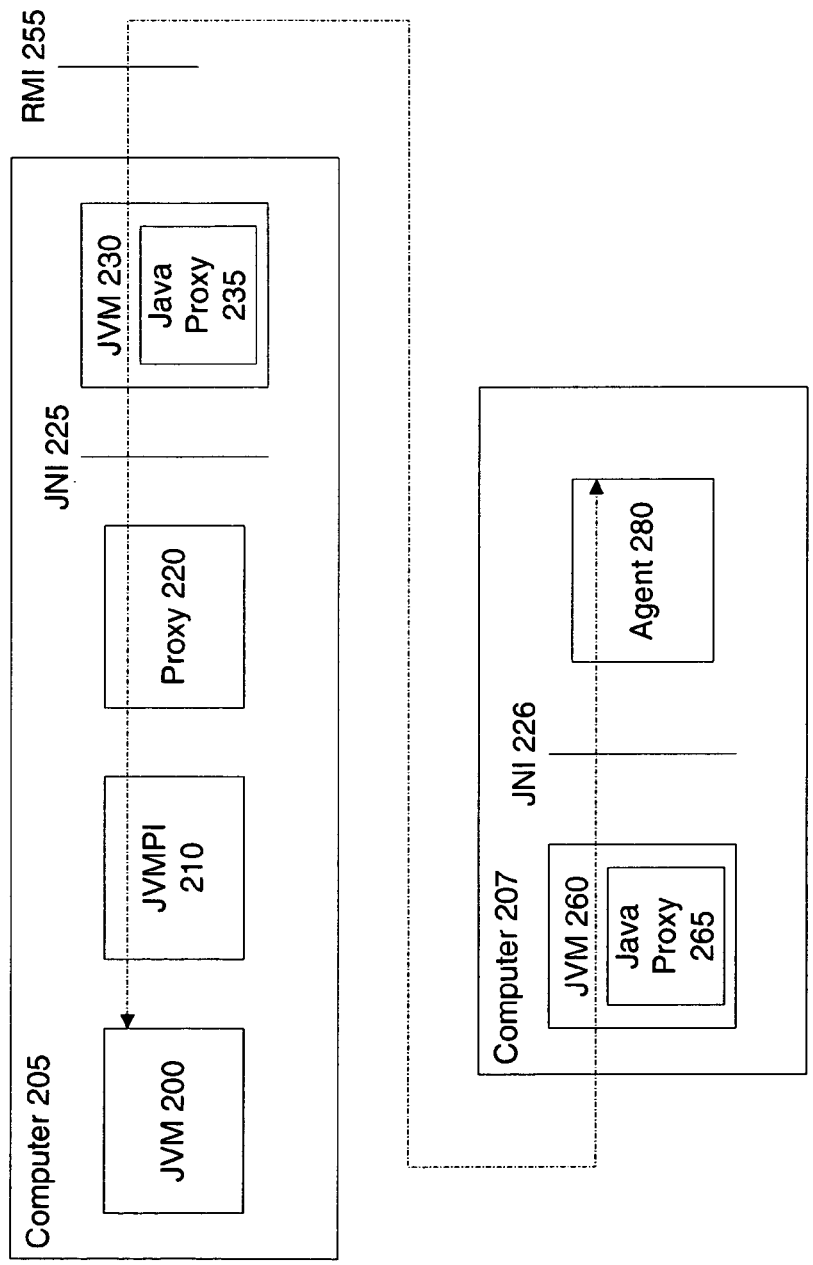
FIG. 3 shows a remote profiling solution using a JVMPI according to work I did leading up to the present invention.
Figure 4:
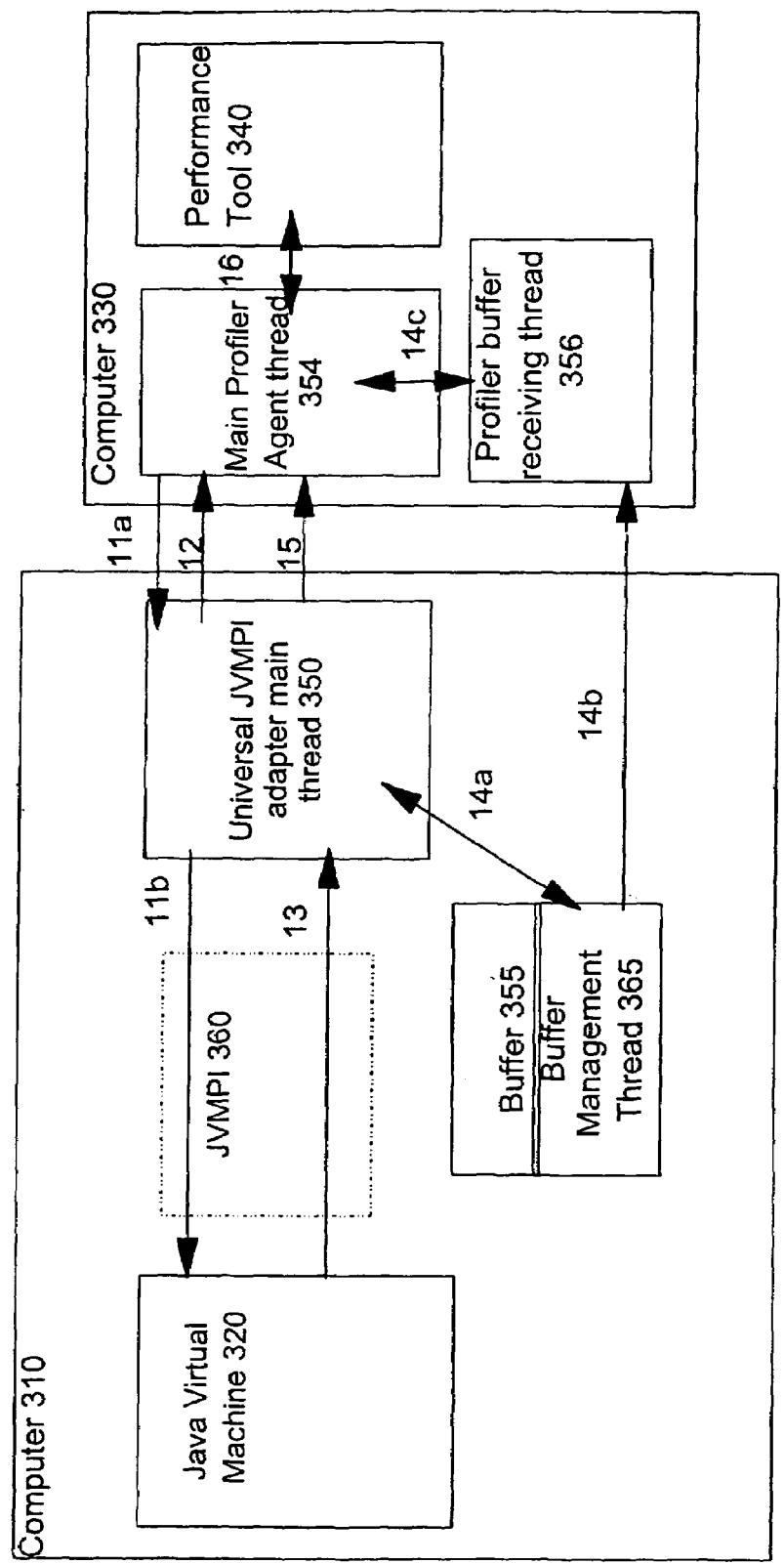
FIG. 4 is a high-level schematic diagram of the operation of a preferred embodiment of the present invention.

Please note, FIGS. 4 to 6 may be read in conjunction with appendix B which provides a pseudo code representation of the functionality supported by both the UJA and the remote profiler agent.

DESCRIPTION OF THE PREFERRED EMBODIMENTS

With reference to FIG. 4, a computer 310 runs a JVM 320. A second computer 330 runs a performance tool 340 for receiving profiling data relating to JVM 320 and any applications running on top of the JVM (not shown) from a main profiler or profiling agent thread (PA) 354. The profiler agent thread runs on computer 330 and so profiles the JVM remotely. Computer 310 also runs a JVMPI 360 and a Universal JVMPI Adapter main thread (UJA) 350. The UJA registers with the JVM through the JVMPI and acts as a local proxy to the remote profiler agent. The UJA communicates through a TCP/IP socket to the profiler agent, and through the JVMPI to the JVM being measured. In the preferred embodiment communication takes place through an agreed port, although other discovery protocols could be used.

The profiler agent thread transmits controls (arrow 11a) via a first connection to the UJA and in return receives responses (arrow 12) and data (arrow 15) over that same connection. As a direct result of these controls the UJA may query the JVM for specific information (arrow 11b), or indeed the local hardware etc (not shown).

Once the remote profiler has successfully established the first connection for UJA controls etc to be transmitted over, a second connection is set-up for the transmission of JVMPI data (ie events) from the UJA to the remote profiling agent. A buffer management thread 365 is spawned on the target computer 310 and a profiling buffer receiving thread 356 on computer 330. The second connection is then established between these two threads.

Specific event types are requested over the first connection 11a, 11b and returned to the main UJA thread. Events are then transmitted in the reverse direction to the UJA and interface functions are processed to enable this and to enable the remote profiler agent to gather additional information.

Events are communicated to the buffer management thread 365 (arrow 14a) via pipes or shared memory semaphores. The buffer management thread is responsible for storing the events in a buffer 355.

In the preferred embodiment, those events which do not need an immediate response from the profiler agent are buffered and sent asynchronously to the profiler agent buffer receiving thread 356 (arrow 14b), thus reducing network traffic. Some events however will have to be sent synchronously in order that the JVM does not terminate prematurely as a result of a delayed response from the profiler agent. According to a preferred embodiment of the invention, JVMPI_EVENT_GC_FINISH, JVMPI_EVENT_GC_START, JVMPIE_EVENT_JVM_SHUT_DOWN, JVMPI_EVENT_THREAD_END and JVMPI_EVENT_THREAD_START reuire synchronous transmission.

Thus the state of flows between the UJA and the Profiler Agent will change from asynchronous to synchronous and back to synchronous, depending on the events, interface functions and UJA controls being processed. When events of the synchronous type are received, the UJA signals to the Buffer Management Thread 365 (arrow 14a) to flush the buffer immediately and transmit it to the receiving thread 356 (arrow 14b). The flushed information is then communicated to the main thread 354 (arrow 14c). The UJA and the JVM will henceforth wait synchronously for the agent to respond. The state will stay synchronous until a UJA control for asynchronous transmission is received from the profiling agent thread.

For asynchronous transmission, when the buffer reaches a pre-determined threshold or when requested to by the profiler agent, the UJA signals to the thread 365 (arrow 14a) to transmit the buffer (arrow 14b) to the receiving thread 356 and then on to the main thread 354 (arrow 14c).

Note, the data transmitted between thread 365 and thread 356 is preferably compressed before transmission. It will be appreciated that the JVM may generate a large number of events and that both the buffering and data compression help prevent the network from being overwhelmed.

It will be apparent that events can be generated by multiple threads (not shown) in the JVM, but are always received by the main JVM thread 320 which has loaded the UJA. This effectively marshals data from any active threads into a single thread (UJA 350). State changes from asynchronous to synchronous buffer transmission therefore apply to ALL running JVM threads.

Note, the flow of data and events from the UJA to the profiling agent can alternatively be completely synchronous. The completely synchronous mode is to assist in testing by providing deterministic behaviour. It requires flows between the remote profiler and the JVM for every interface function and event, and therefore has lower performance and greater data perturbation than the mixed mode of asynchronous/synchronous transmission.

Note, data is sent by a write( ) function in the UJA buffer manager thread when one of the conditions to trigger buffer transmission occurs if running in asynchronous mode, or immediately if running synchronously. The remote profiler data receiving thread retrieves buffer data with a read( ) function.

The performance tool 340 receives data regarding these events from the main profiler agent thread 354 via arrow 16 and also communicates in the reverse direction with thread 354. The purpose and content of all transmitted data will be explained with reference to FIG. 6a.

Figure 5A:
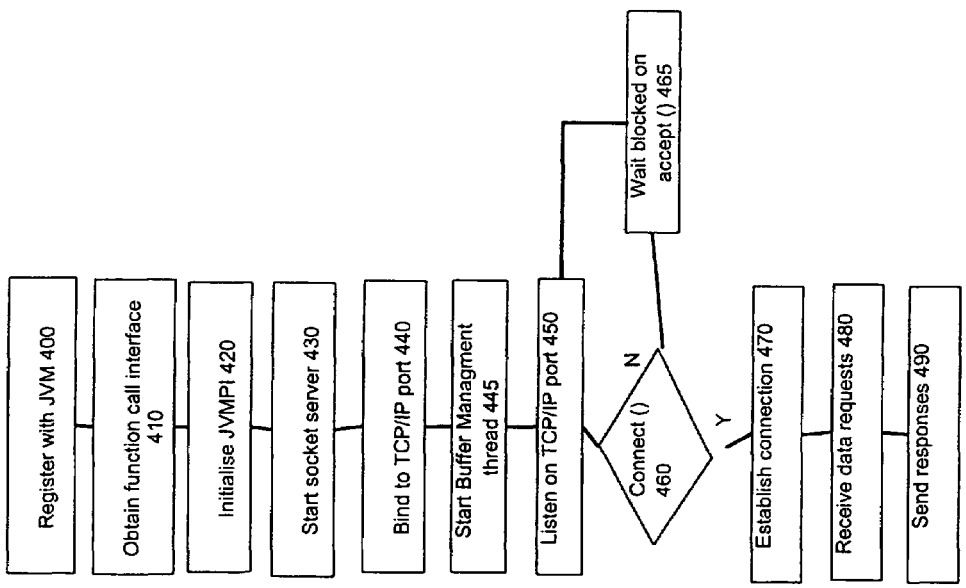
FIG. 5a shows the operation of the universal JVMPI adapter (UJA) according to a preferred embodiment of the present invention.

FIG. 5a shows the operation of the universal JVMPI adapter according to a preferred embodiment of the present invention and should be read in conjunction with FIG. 4.

The JVM 320 is launched with the command "java -XrunUJA" (where UJA is the name of the adapter 350). The UJA includes the JVM_OnLoad( ) entry-point and by default, the command will register the UJA with the JVM through this method (step 400). The UJA obtains a function call interface by issuing a GetEnv call on the JavaVM pointer (step 410) and the JVMPI is then initialized (step 420). Thus it can be seen that the UJA offers some of the basic functionality of a profiler agent of the prior art. In the preferred embodiment the notifyEvent function, JVM_Onload entry-point code, and the GetEnv and JVMPI interface initialisation functionality have all been transferred to the UJA.

The UJA and the remote profiling tool communicate using a connection-oriented protocol and in the preferred embodiment they correspond to a TCP/IP server and client respectively. TCP/IP service is facilitated via endpoints, known as sockets. A socket comprises the host's IP address, along with a 16 bit number, called a port, and communication takes place between a socket running on the server and one running on the client. The colon delimiter may be used with the -Xrun command in order to specify additional options and one of these may be the port number. For example -XrunUJA:address=<port#>. The UJA starts a socket server with a socket( ) function (step 430) and then binds the TCP port number specified with address=<port#>(eg 8000) using a bind( ) function (step 440).

Further, the initialization of the UJA includes starting the buffer management thread (step 445). This is incorporated in order to minimise network traffic and provide for a more efficient solution. It communicates through signals with the UJA.

The UJA listens on the port to which it has bound using a listen( ) function (step 450) and waits for the remote profiler agent to issue a connect( ) (step 460). Until this is received the UJA waits blocked on an accept( ) function (step 465) and continues listening on the port. As soon as a connect( ) is detected, the UJA can establish a connection with the remote profiler agent (step 470) and receive data/requests from the profiler agent via a read( ) function (step 480) and send responses via a write function( ) (step 490).

Figure 5B:
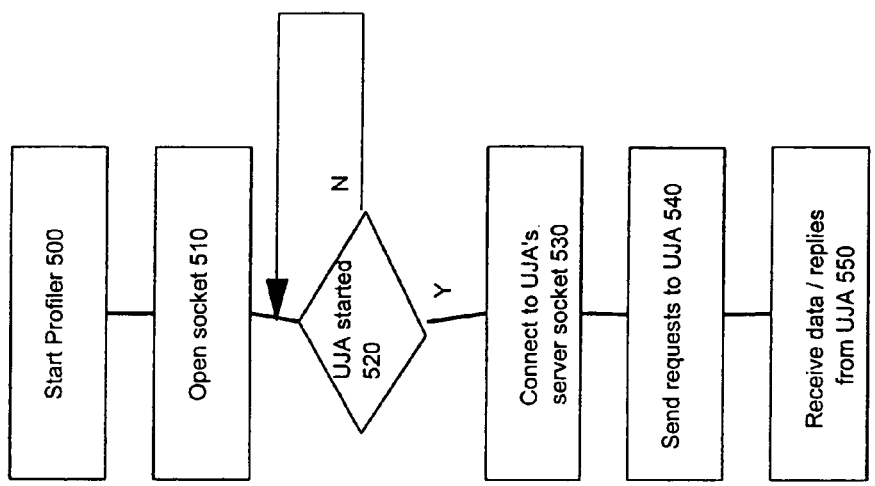
FIG. 5b shows the operation of the profiler agent according to a preferred embodiment of the present invention.

FIG. 5b shows the operation of the profiler agent according to a preferred embodiment of the present invention and should be read in conjunction with FIGS. 4 and 5a.

The profiler agent is started at step 500 with the command "Myprofiler -attach <hostname>:<port#>. The hostname identifies the computer upon which the JVM and UJA are running, and the port is the same as the one specified at UJA start-up.

The profiler opens a socket using a socket( ) function (step 510) and verifies whether the UJA is running on the remote machine (step 520). If not, the profiler agent waits until it detects the UJA's presence. It then connects to the UJA's server socket using the connect( ) function with hostname and port number provided at client profiler agent start-up (step 530). Once a connection has been established established, the UJA can accept requests (ie the accept( ) function is no longer "blocked"). The profiler sends such requests via a write( ) function (step 540), and receives replies with a read( ) function (step 550).

Figure 6A:
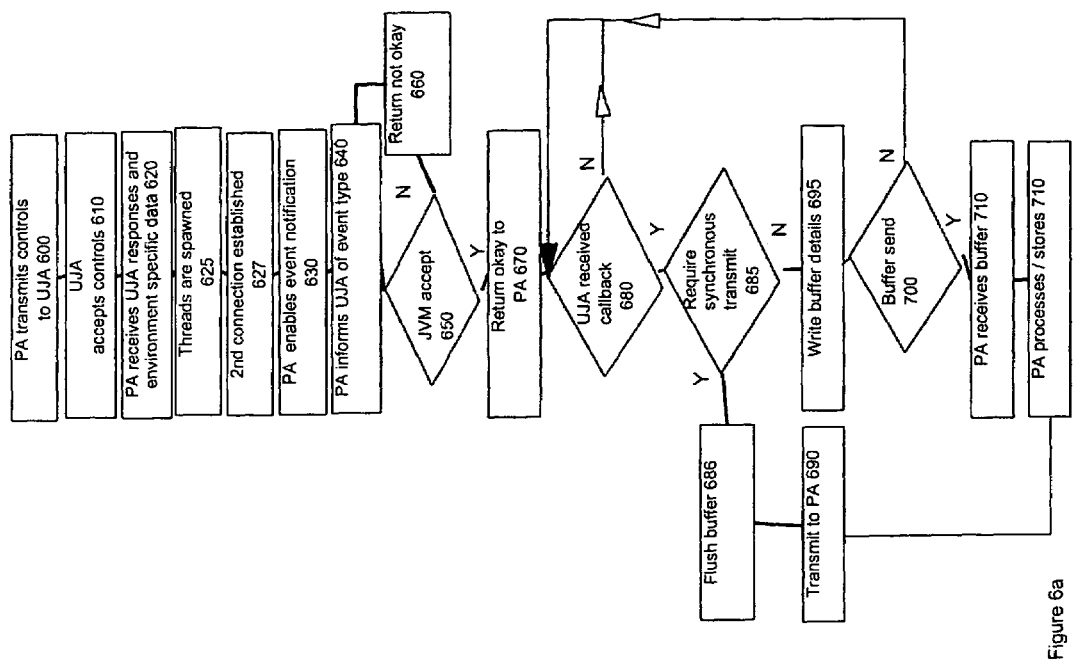
FIG. 6a is a flowchart of the data exchange that takes place between the UJA and the profiler agent according to a preferred embodiment.

FIG. 6a is a flowchart of the data exchange that takes place between the UJA and the profiler agent according to a preferred embodiment. In other words, the diagram expands upon steps 480 and 490 of FIG. 5a and steps 540 and 550 of FIG. 5b. It should be read in conjunction with FIG. 4.

Once a connection has been established between the profiler agent and the UJA, the profiler agent transmits controls via control data packets to the UJA in order to control its operation at step 600. These are accepted by the UJA at step 610.

Figure 6B:
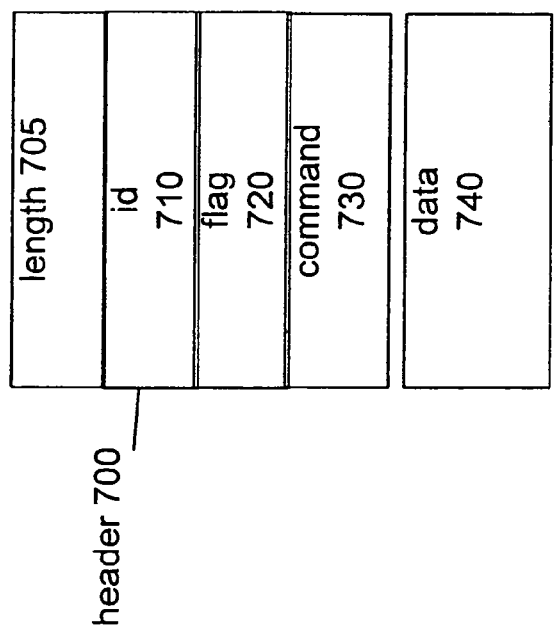
FIG. 6b shows the layout of a control data packet according to a preferred embodiment of the present invention.
Figure 6C:
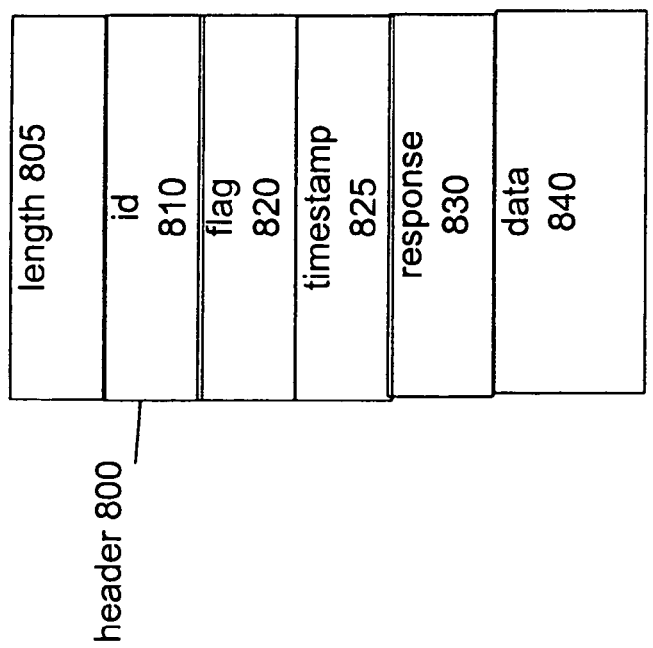
FIG. 6c shows the layout of a response data packet according to a preferred embodiment of the present invention.

According to the preferred embodiment, the structure of control data packets are of big-endian format. They are also similar to those defined by Sun Microsystems Corporation in the Java Debug Wire Protocol (JDWP). Some key differences, however, are that the USA control packet flows are synchronous and do not have to be paired with unique id fields. The id field is provided for other purposes, described below. The layout of these packets is shown in FIG. 6b.

A header 700, consists of a length field 705 which is 4 bytes long. This indicates the length of the whole packet, which according to the preferred embodiment is a minimum of 10 bytes. An id field 710 (4 bytes) contains a unique identifier which can be set by the originator of the control. If set, it will be echoed (within a response field (see later) forming part of a header pre-pended to all responses) on all responses to the control and event data generated as a result of the control. The unique identifier can then be used for tracking purposes.

A flag 720 (1 byte) signals state change between the UJA and the remote profiler agent. According to the preferred embodiment, 0x81 is used to switch event flow to synchronous transmission and 0x82 to switch the flow to asynchronous. A command field 730 (1 byte) contains a hexadecimal value corresponding to a command number. Preferably these are as follows:

1—Query UJA version

2—Query JVM version

3—Query JVMPI version

4—Query target platform operating system and level

5—Query target platform hardware

6—Query target platform RAM amount

7—Query target system endianness

10—Define transmission state, synchronous or asynchronous

12—Define trace buffer length

13—Define trace buffer operation

14—Define data compression format

15—Define the event data to be returned to the tool

16—Undefine the event data

17—Transmit the data buffer contents

20—Detach from JVM

30—Terminate JVM

100–126—interface functions

Note, the each value is actually stored as a hexadecimal value within the one byte response field, but has been listed in decimal for ease of understanding.

Finally there is a data field 740 of variable length. This may contain data indicating the length of the trace buffer, the data compression format etc.

As can been seen from the commands listed above there are controls for turning data compression on or off, requesting UJA environment specific data, and determining whether all JVM events are to be transmitted synchronously to the remote profiling agent from the UJA, or whether they should be batched and sent asynchronously. A further control is used to ensure that each JVMPI event has a 64-bit high resolution timestamp added to it. This allows the profiling tool to provide accurate timing information in its subsequent analysis, and interleave events received from multiple JVMs being profiled.

The size of a buffer to be used by the UJA is also specified via a control, along with various buffer actions. Note, controls can be sent at anytime and not just at startup. Thus they can also include: start tracing; stop tracing; transmit buffer to client; circular buffer wrap; stop tracing when buffer full; and transmit when GC START event received. Typically, the contents of the buffer are transmitted to the remote agent when filled; when requested by the tool; or at JVM shutdown.

In response to the request for UJA environment specific data by the profiler agent, the UJA queries this information and transmits it at step 620. In the preferred embodiment, this includes: UJA version number; target JDK level; target JVMPI level; target platform hardware; target platform operating system & level; target system RAM; and target system "Endianness" (Note, the default is big endian/network byte order).

The profiler agent will also receive appropriate responses (step 620) from the UJA. These can include data conventions used by the measured JVM—pointer size, byte ordering, bit ordering, string encoding—and additional responses such as whether the control packet header was ok or not, the length of following data, an indication that the JVM is terminating etc. Note, the layout of a response data packet is virtually identical to that of a control packet and is shown with reference to FIG. 6c. If set in the corresponding control data packet, then the id field 810 echoes the unique identifier in corresponding control packets. A flag field 820 uses the same hexadecimal values as those used by a control packet to switch between synchronous and asynchronous transmission. Additionally however, 0x80 is used to indicate that this packet contains a response. Moreover, instead of a command field 730 there is a response field 830 (1 byte). According to the preferred embodiment, this contains a value corresponding to one of those listed below:

0—command processed without error

110—Invalid transmission state requested

112—Invalid trace buffer length requested

113—Invalid trace buffer operation requested

114—Invalid data compression format requested

112—VM_DEAD

123—invalid UJA command

255—fatal error, UJA terminating

Note, the each value is actually stored as a hexadecimal value within the one byte response field, but has been listed in decimal for ease of understanding.

Once again there is also a data field 840 of variable length. This contains the information requested by a corresponding control. For example, in response to a command, 'Query JVPI version' int jvmpiVersion will be returned. This is the JVMPI version number as returned from JVMPI inteface version function ('jint version').

The exchange of controls and receipt of UJA responses and data by the profiler agent prepare both ends for event requests etc. In the preferred embodiment, the UJA supports all the events that the JVM it is attached to provides.

Remote JVMPI interface and event functions can now start to be processed. The interface functions are bidirectional initiated, and in most cases are run synchronously by the UJA between the JVM and the profiling agent.

The remote tool invokes an interface function by sending a UJA control packet specifying the appropriate interface command number, and where required, the necessary data that function requires in the control packet data field. Appendix C lists each interface function and its corresponding command number.

The UJA performs the function requested, and returns updated or requested data as required. Note that the void (*NotifyEvent)(JVMPI_Event *event) is already implemented by the UJA on behalf of the remote tool, so is not required. The call-back from the JVM to the profiling agent occurs in the UJA, not the remote tool—the remote tool logic processing handles events passed from the UJA buffer manager thread.

To aid comprehension, an example of the control packet used to enable the profiler agent to request to be sent the thread CPU time, and the corresponding response containing a value of 285010 nanoseconds:

| UJA control packet | | |
|---|---|---|
| Header | | |
| length | 10 | (4 bytes) |
| id | xxx | (4 bytes) |
| flag | 0 × 81 | (1 byte) |
| command | 0 × 70 | (1 byte) |
| ( No data ) | | |

| UJA response packet | | |
|---|---|---|
| Header | | |
| Length | 26 | ( 4 bytes ) |
| id | xxx | ( 4 bytes ) |

| UJA response packet | | |
|---|---|---|
| Header | | |
| flag | 0 | ( 1 byte ) |
| response | 0 × 80 | ( 1 byte ) |
| Timestamp | nnnnnnnn | ( 8 bytes ) |
| Data | 00285010 | ( 8 bytes ) |

As previously mentioned with reference to FIG. 4, events are transmitted to the profiler agent over a second connection consisting of a link between the buffer management thread and the profiler buffer receiving thread. Referring again to FIG. 6a, to enable this at step 625, the UJA spawns the buffer management thread. The profiler agent also spawns the profiler buffer receiving thread 356. Thread 356 opens a socket server on an agreed port number, and the buffer management thread connects to it (step 627). As previously mentioned, it is over this second connection that event data is sent. Two connections are established so that neither event data nor control data is interrupted by the other. (Note, steps 625 and 627 are not referenced in Appendix B.)

At step 630, the remote profiler agent 254 enables event notificiation of all events that the JVM generates which it is interested in. In the example given in Appendix B, this is achieved via jvmpi_interface->EnableEvent(JVMPI_EVENT_CLASS_LOAD, NULL) and only the JVMPI_EVENT_CLASS_LOAD events (ie the loading of a new java class) are of interest. Note, specific event types can be requested at any time over the first connection.

The profiler agent then informs the UJA of these events at step 640 (event->u.class_load.class_name;). To achieve this, the profiler agent wraps the enabling class load event type notification code with a UJA header and issues a write( ) to its socket connection to transmit to the UJA. It will be appreciated that a control packet is used with '15' contained within the command field. The particular event name is contained within the data field. Event types may also be specified during initialisation (ie step 600).

The UJA communicates the received information to the JVM (jvmpi_interface->EnableEvent(JVMPI_EVENT_CLASS_LOAD, NULL)) and then verifies to see whether the requested event notification is accepted by it (step 650). If not, the UJA returns a status of "not okay" to the profiler agent (step 660) and the agent can then request the same event again or a new type (step 640). Alternatively, the agent can do nothing but wait for previously enabled events (not shown).

If the event type is accepted, then the UJA returns a status of "okay" to the profiler agent and subsequently waits for callback by the JVM of the requested event (step 680). When this is received, the UJA determines whether a synchronous transmission is required to the profiler agent (step 685). If so, the buffer management thread is signalled to flush the buffer (686) and transmit it to the profiler agent (step 690) over the second connection. The information is then processed/stored as appropriate (step 710). (Such events will typically cause the profiler agent to respond forthwith to the JVM.) Otherwise the details are written to the buffer (step 695) for asynchronous transmission. In the preferred embodiment, the buffer management thread checks to see whether this triggers a buffer send by going over a pre-determined threshold (step 700) and if not, waits for call back regarding subsequent events until a buffer send is triggered. Otherwise, the buffer manager thread transmits the buffer to the profiler agent at step 710. This is received by the profiler agent buffer receiving thread and is then the data is processed/stored as appropriate (step 720).

Note, preferably the format of the data sent by the buffer is as follows:

length (4 bytes)—this includes a total calculated from the length, and id, (see below), and also from the length of the event data contained within the char field (see below);

id (4 bytes)—this is the unique id sent by the profiler agent when it issued command 17 via a control packet;

char—buffered event data. Repeated instances of UJA response packets.

If for example, the remote profiler requests to be informed whenever the JVM loads a new java class (u.class_load. class_name), the name of the loaded class is required from the UJA by the profiling agent. Thus the field char in the buffer will contain a complete UJA response packet with the header fields and the contents of class_name in the data field.

This layout is repeated for subsequent events. Furthermore, if a compression algorithm has been requested, this will be applied to the whole buffer just before transmission.

Note, the profiler agent may continue to receive both individual and buffered events until the JVM terminates. At termination, the UJA informs the profiler agent via a response that the JVM is shutting down. A close function( ) then shuts both the UJA and profiler agent sockets', and thus the connection is broken.

It will be appreciated that the UJA may transmit data/responses at anytime during processing either on its own initiative or at the request of the profiler agent. Likewise, the profiler agent may at anytime request notification of new events, disablement of certain event notifications etc.

The UJA provides a generic interface to the profiler agent which is remotely accessible as opposed to the proprietary interfaces typically used in client/server profiling tools. It is envisaged that the UJA will typically be provided by the JVM supplier for each specific platform. Thus performance tool vendors need only modify the profiler agent once to interact with the UJA over the network, rather than having to port their agent to multiple platforms. In other words, this one modification will then allow their tool to operate in conjunction with a JVM on any platform for which a UJA is available. At the same time, the tools vendor is relieved of any need to support their profiling agent on different platforms.

This remote setup is particularly applicable to performance profiling those applications which execute on embedded systems. Such systems are invariably extremely limited in terms of resource. Typically, profiling tools perturb the performance characteristics of the system they are measuring. The events which the JVMPI is capable of generating that are of interest to performance tools, such as method entry and exit, occur very frequently and can accumulate high data volumes. The processing of such data is resource hungry. Additionally, many 3rd party tools offer 'real time' visualization of Java performance data as it is being generated. If the computer being measured is the same one as is being used to display the data, the perturbation of the data can be quite considerable. This is not such a problem with the powerful desktop machines, but can really overwhelm a resource constricted system.

In order to interact with the UJA, a standard profiling agent may be modified to include a bolt-on front-end component (not shown). This would, for example, be responsible for setting up communications between the agent and the UJA and for transmitting data between the two. Additionally, it would amongst other things, receive events and perform decompression of data where necessary. Furthermore, it would process the time stamping such that buffered events would be fed in a quasi-synchronous manner to the main profiling agent, as if it were located on the same system as the JVM itself (obviously this would have to be subject to some fixed network delay).

Alternatively the profiling agent could be modified to natively support the UJA. In other words, to work directly with buffered events etc. Although this would be more time-consuming initially, it would offer greater flexibility in the long run.

Finally, it will be apparent to a person skilled in the art that although the profiler agent and the performance tool are shown as running on the same computer, the invention is not limited to such. Rather, the profiler agent may receive events from the UJA and then communicate information based on these events to a performance tool running on a remote machine.

```
include <jvmpi.h>
    // global jvmpi interface pointer
    static JVMPI_Interface *jvmpi_interface;
    // function for handling event notification
    void notifyEvent(JVMPI_Event *event) {
        switch(event->event_type) {
            case JVMPI_EVENT_CLASS_LOAD:
                fprintf(stderr, "myprofiler> Class Load : %s\n",
        event->u.class_load.class_name);
                break;
        }
    }
    // profiler agent entry point
    extern "C" {
        JNIEXPORT jint JNICALL JVM_OnLoad(JavaVM *jvm,'
        char *options,
        void *reserved) {
            fprintf(stderr, "myprofiler> initializing . . . \n");
            // get jvmpi interface pointer
            if ((jvm->GetEnv((void **)&jvmpi_interface,
            JVMPI_VERSION_1)) <
    0) {
                fprintf(stderr, "myprofiler> error in obtaining jvmpi
        interface pointer\n");
                return JNI_ERR;
            }
            // initialize jvmpi interface
            jvmpi_interface->NotifyEvent = notifyEvent;
            // enabling class load event notification
            jvmpi_interface->EnableEvent
            (JVMPI_EVENT_CLASS_LOAD, NULL);
            fprintf(stderr, "myprofiler> . . . ok \n\n");
            return JNI_OK;
        }
    }
```

Appendix A: the source code for a simple profiler agent provided by Sun Microsystems.

```
// New High level UJA logic
// open a socket
// bind to a port
// start the buffer manager thread
// listen on that port for remote tool requests
// start a buffer manager thread
// establish connection with remote tool
// accept UJA controls for data transmission, buffer controls etc.
// provide UJA data as requested on details of local system
            // New High level remote tool logic
            // open a socket
            // connect to the host, port used of the UJA
            // exchange UJA controls and data with the
            // UJA sufficient to prepare the tool and UJA
```

-continued

```
                    // for event requests
                    // Existing Low level remote tool logic
                    // enabling class load event notification
            jvmpi_interface->EnableEvent
                (JVMPI_EVENT_CLASS_LOAD, NULL);
                    // tell the UJA what event data the remote tool
                    // is interested in
                    event->u.class_load.class_name;
                    // New High level remote tool logic
                    // wrap enabling class load event notification
                    // code with UJA wrapper/header
                    // issue write ( ) to its socket connection to
                    // transmit to the UJA
// New UJA low level logic
// issue the JVMPI_EVENT_CLASS_LOAD, NULL enable event as
local proxy on remote tool's behalf
// enabling class load event notification
jvmpi_interface->EnableEvent(JVMPI_EVENT_CLASS_LOAD,
NULL);
// High level UJA logic
// check requested event has been accepted by the local JVM
// return an OK/not OK response to the remote tool
                    // New High level remote tool logic
                    // check event request has been processed
                    // OK by UJA
                    // wait for UJA buffer transmissions
// High level UJA logic
// Callback received by UJA for a requested event
// Write details of data for that event that the tool
// requested to UJA buffer.
// If this triggers a buffer-send by going over a threshold,
// signal the buffer manager thread to transmit the buffer
                    // New High level remote tool logic
                    // receive UJA buffer
                    // process/store buffer data as required
```

Appendix B: a pseudo code representation of the functionality supported by both the UJA and the remote profiler agent according to a preferred embodiment of the present invention.

| | UJA command number |
|---|---|
| | /* interface functions */ |
| | typedef struct { |
| 100 | jint version; /* JVMPI version */ |
| | /* ------interface implemented by the profiler------ */ |
| | void (*NotifyEvent)(JVMPI_Event *event); |
| | /* ------interface implemented by the JVM------ */ |
| 101 | jint (*EnableEvent)(jint event_type, void *arg); |
| 102 | jint (*DisableEvent)(jint event_type, void *arg); |
| 103 | jint (*RequestEvent)(jint event_type, void *arg); |
| 104 | void (*GetCallTrace)(JVMPI_CallTrace *trace,jint depth); |
| 105 | void (*ProfilerExit)(jint); |
| 106 | JVMPI_RawMonitor(*RawMonitorCreate)(char *lock_name); |
| 107 | void (*RawMonitorEnter)(JVMPI_RawMonitor lock_id); |
| 108 | void (*RawMonitorExit)(JVMPI_RawMonitor lock_id); |
| 109 | void (*RawMonitorWait)(JVMPI_RawMonitor lock_id, jlong ms); |
| 110 | void (*RawMonitorNotifyAll)(JVMPI_RawMonitor lock_id); |
| 111 | void (*RawMonitorDestroy)(JVMPI_RawMonitor lock_id); |
| 112 | jlong (*GetCurrentThreadCpuTime)(void); |
| 113 | void (*SuspendThread)(JNIEnv *env); |
| 114 | void (*ResumeThread)(JNIEnv *env); |
| 115 | jint(*GetThreadStatus)(JNIEnv *env); |
| 116 | jboolean (*ThreadHasRun)(JNIEnv *env); |
| 117 | jint (*CreateSystemThread)(char *name, jint priority, void (*f)(void *)); |
| 118 | void (*SetThreadLocalStorage)(JNIEnv *env_id, void *ptr); |
| 119 | void * (*GetThreadLocalStorage)(JNIEnv *env_id); |
| 120 | void (*DisableGC)(void); |
| 121 | void (*EnableGC)(void); |
| 122 | void (*RunGC)(void): |
| 123 | jobjectID (*GetThreadObject)(JNIEnv *env); |

| | UJA command number |
|---|---|
| 124 | jobjectID (*GetMethodClass)(jmethodID mid); |
| 125 | jobject (*jobjectID2jobject)(jobjectID jid): |
| 126 | jobjectID (*jobject2jobjectID)(jobject j); |
| | } JVMPI_Interface; |

Appendix C: the interface aa defined by the Sun Corporation between the profiler agent and the JVM, along with the correaponding command number to enable the profiler agent to invoke each listed function according to a preferred embodiment of the present invention.

The invention claimed is:

1. Apparatus for providing application execution data to a profiling agent on a remote system as requested by said agent, wherein a first application local to said apparatus generates said application execution data, said apparatus comprising:
   means for receiving a request via a network interface from said profiling agent for said application execution data;
   means, responsive to said request, for requesting said application execution data from said first application via a local interface;
   means for receiving said application execution data from the first application via said local interface; and
   means, responsive to receipt of said application execution data, for transmitting said application execution data to the profiling agent via said network interface,
   wherein said network interface exposes substantially all the functionality of the local interface to said profiling agent and allows receipt of controls from said profiling agent for controlling the operation of said apparatus, at least one of said controls providing for selectively switching between synchronous and asynchronous transmission of said application execution data to said profiling agent.

2. Apparatus for providing application execution data to a profiling agent on a remote system as requested by said agent, wherein a first application local to said apparatus generates said application execution data, said apparatus comprising:
   means for receiving a request via a network interface from said profiling agent for said application execution data;
   means, responsive to said request, for requesting said application execution data from said first application via a local interface;
   means for receiving said application execution data from the first application via said local interface; and
   means, responsive to receipt of said application execution data, for transmitting said application execution data to the profiling agent via said network interface,
   wherein said network interface exposes substantially all the functionality of the local interface to said profiling agent and allows receipt of controls from said profiling agent for controlling the operation of said apparatus, said controls being transmitted to said apparatus over a first connection, and said application execution data being transmitted to said profiling agent over a second connection.

3. Apparatus for providing application execution data to a profiling agent on a remote system as requested by said agent, wherein a first application local to said apparatus generates said application execution data, said apparatus comprising:

means for receiving a request via a network interface from said profiling agent for said application execution data, said application execution data comprising events;

means, responsive to said request, for requesting said application execution data from said first application via a local interface;

means for receiving said application execution data from the first application via said local interface;

means, responsive to receipt of said application execution data, for transmitting said application execution data to the profiling agent via said network interface;

a buffer for storing said application execution data prior to transmission to said profiling agent and each event stored in said buffer includes a timestamp, at least one of said events being specified as synchronous; and means responsive to receipt of a synchronous event for switching to synchronous transmission of said application execution data.

4. A method for providing application execution data to a profiling agent on a remote system as requested by said agent, wherein a first application generates said application execution data, said method comprising the steps of:

receiving a request at an apparatus via a network interface from said profiling agent for said application execution data;

responsive to said request, requesting said application execution data from said first application via a local interface;

receiving said application execution data at said apparatus from the first application via said local interface; and responsive to receipt of said application execution data at said apparatus, transmitting said application execution data to the profiling agent via said network interface; said network interface exposing substantially all the functionality of the local interface to a profiling agent on a remote system, receiving controls from the profiling agent for controlling execution of the application; and, responsive to receipt of at least one of said controls, selectively switching between synchronous and asynchronous transmission of said application execution data to the profiling agent.

5. A method for providing application execution data to a profiling agent on a remote system as requested by said agent, wherein a first application generates said application execution data, said method comprising the steps of:

receiving a request at an apparatus via a network interface from said profiling agent for said application execution data;

responsive to said request, requesting said application execution data from said first application via a local interface;

receiving said application execution data at said apparatus from the first application via said local interface; and responsive to receipt of said application execution data at said apparatus, transmitting said application execution data to the profiling agent via said network interface; said network interface exposing substantially all the functionality of the local interface to a profiling agent on a remote system;

receiving controls from the profiling agent for controlling execution of the application, said controls being transmitted to the apparatus over a first connection and said application execution data being transmitted to the profiling agent over a second connection.

* * * * *